Figure 1:
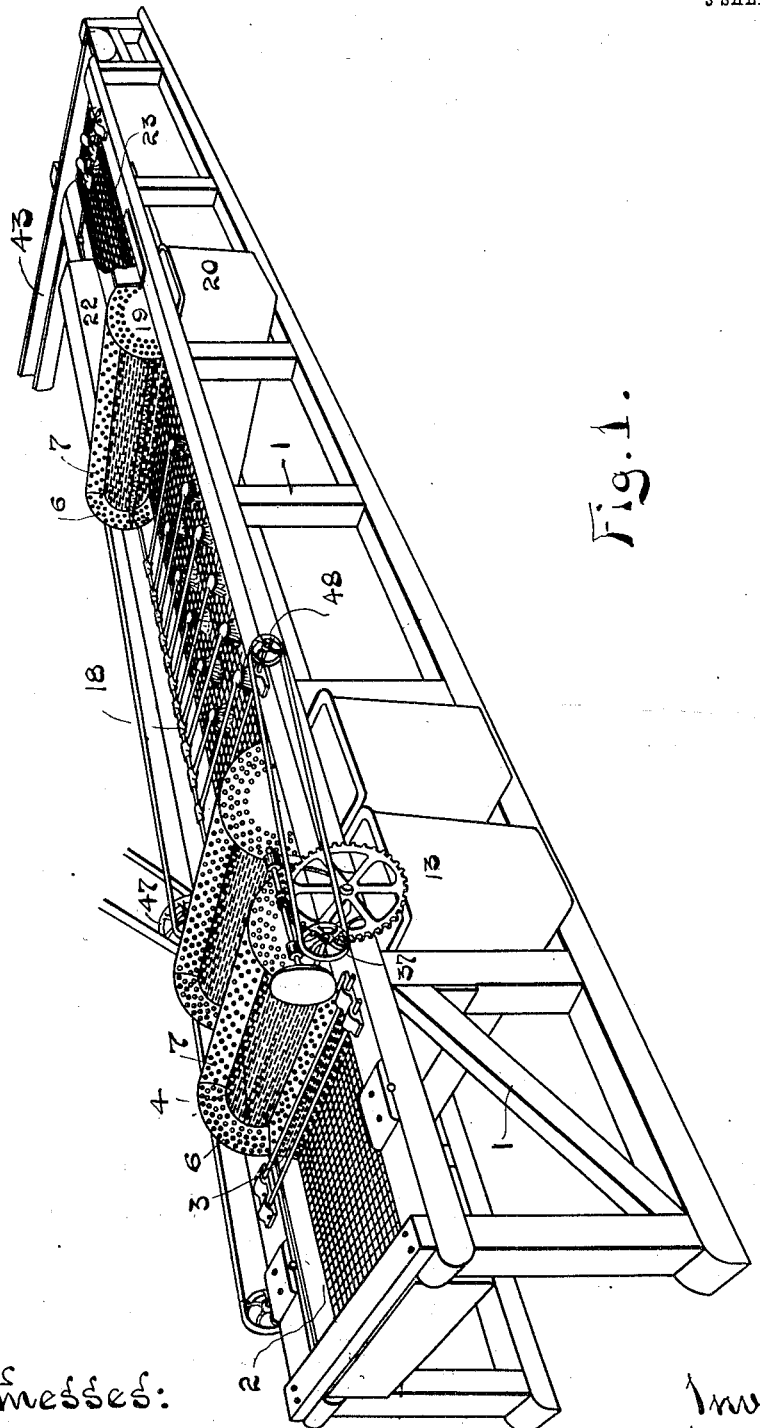

No. 849,650. PATENTED APR. 9, 1907.
W. C. ANDERSON.
APPARATUS FOR PROCESSING FRUIT.
APPLICATION FILED FEB. 26, 1906.

3 SHEETS—SHEET 1.

Witnesses:
Jesse R. Eoff
H. Allbright

Inventor:
William C. Anderson
By W. H. Smyth
his atty

No. 849,650. PATENTED APR. 9, 1907.
W. C. ANDERSON.
APPARATUS FOR PROCESSING FRUIT.
APPLICATION FILED FEB. 26, 1906.
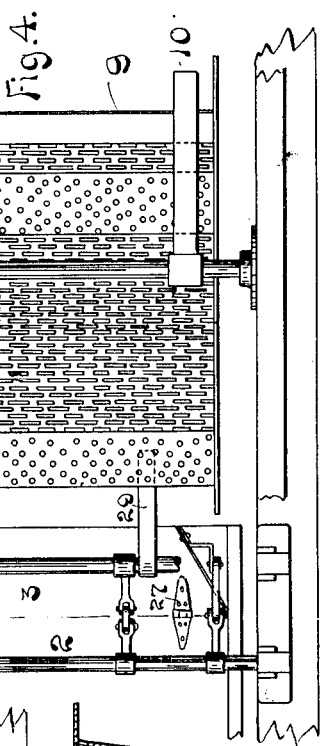
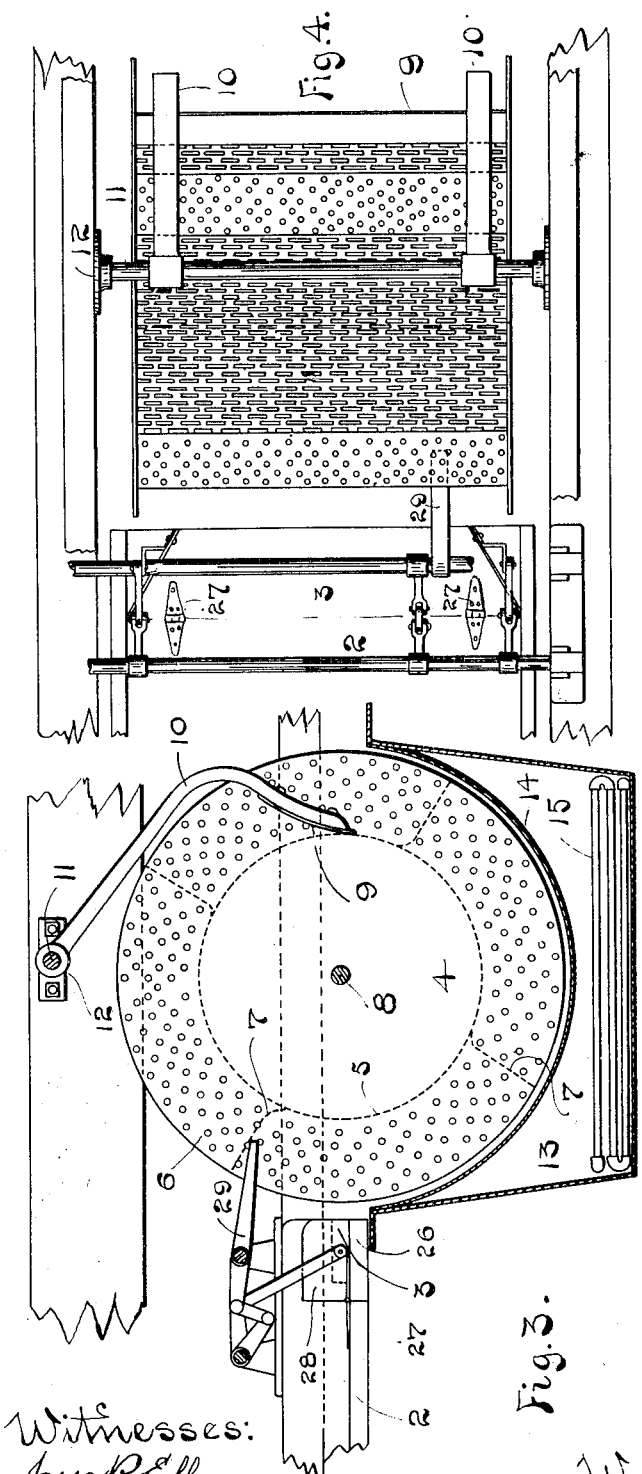
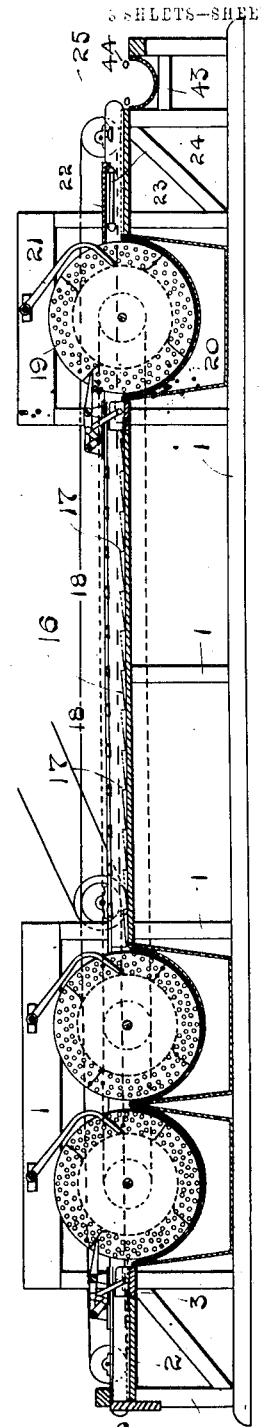
Witnesses:
Inventor:—
William C. Anderson
By W. H. Smyth his atty.

No. 849,650. PATENTED APR. 9, 1907.
W. C. ANDERSON.
APPARATUS FOR PROCESSING FRUIT.
APPLICATION FILED FEB. 26, 1906.
3 SHEETS—SHEET 3.
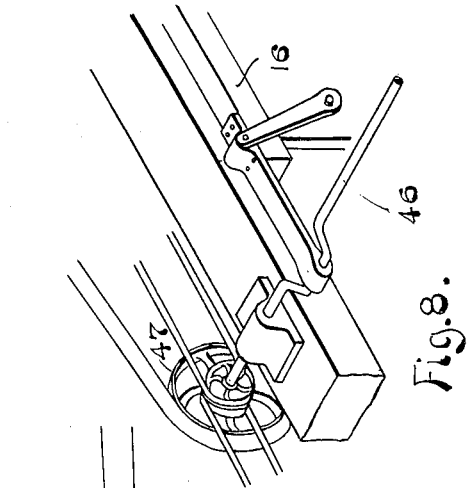
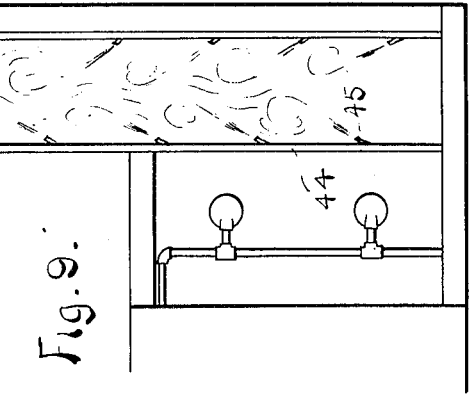
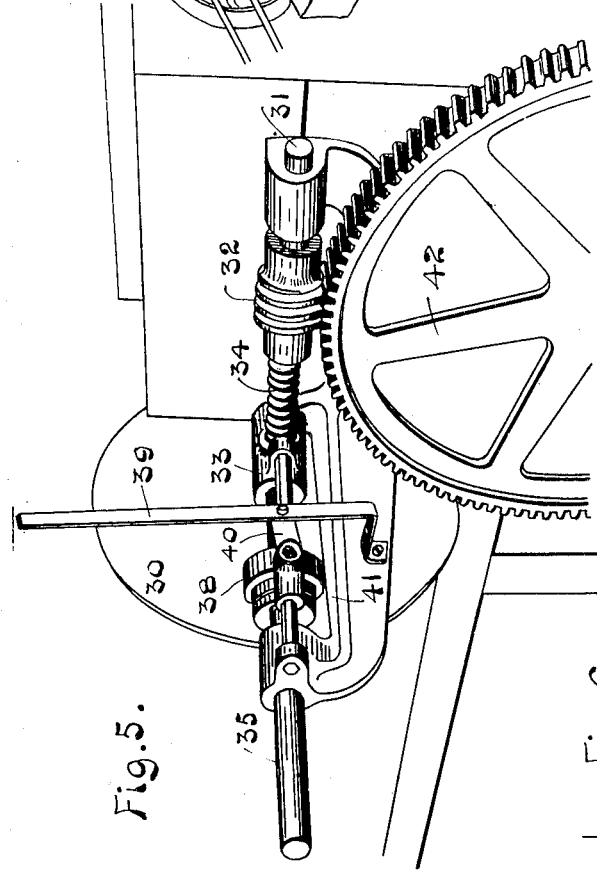
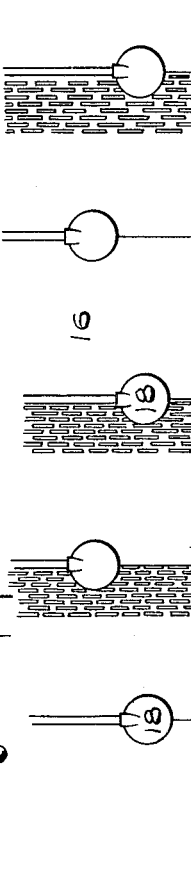
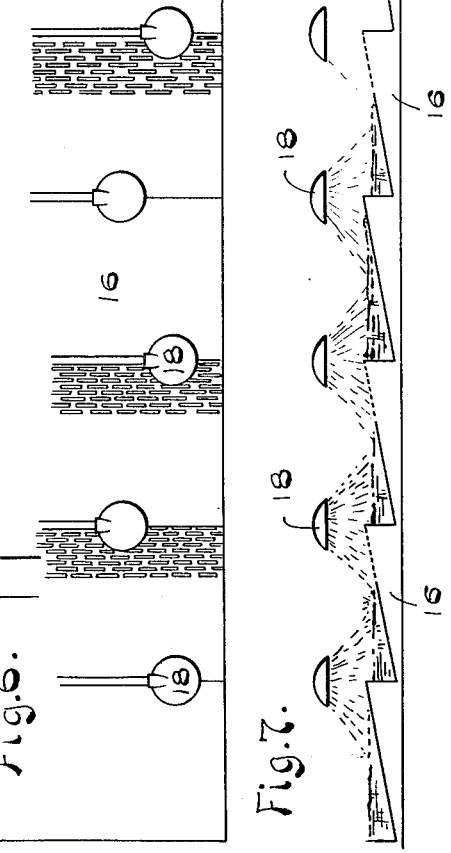
Witnesses:
Jesse P. Goff
H. W. Wright
Inventor:
William C. Anderson
By W. H. Smyth
his atty.

UNITED STATES PATENT OFFICE.

WILLIAM C. ANDERSON, OF SAN JOSE, CALIFORNIA.

APPARATUS FOR PROCESSING FRUIT.

No. 849,650.  Specification of Letters Patent.  Patented April 9, 1907.

Application filed February 26, 1906. Serial No. 303,041.

*To all whom it may concern:*

Be it known that I, WILLIAM C. ANDERSON, a citizen of the United States, residing at San Jose, in the county of Santa Clara and State of California, have invented certain new and useful Improvements in Apparatus for Processing Fruit; and I do hereby declare the following to be a full, clear, and exact description of the same.

This invention relates to a machine for processing or treating fruit.

In the preparation of various kinds of fruit it is necessary to subject them to a variety of treatments, dependent upon the nature of the fruit and also the final form in which they are put up for the market. Thus with some characters of fruit it is necessary only that they should be dipped in a bath of prepared solution. Others, again, require a number of such dippings, both hot and cold, and still others require that, besides the dipping and washing, the skins be removed.

Owing to the nature of the material operated upon it is highly desirable, and, in fact, essential that the processing shall be under close control as to time, temperature, and other features in their preparation. It is also essential that the fruit shall be handled with care and delicacy to avoid bruising or crushing, which would disfigure the product and render it unsalable.

One of the objects of the present invention is to provide an automatic device capable of subjecting fruit of various kinds to any or all of the necessary processing steps in one continuous operation—that is to say, an automatic machine to which the fruit may be delivered promiscuously in its natural condition as received from the orchard or halved and pitted and from which it will be delivered ready for packing, whether in cans or otherwise.

The machine here illustrated is particularly adapted for peeling and preparing peaches in condition to be packed in hermetically-sealed cans. As this character of fruit requires practically all of the processing steps, the machine designed to carry out the processing of peaches is adapted to treat other fruits which require equally elaborate treatment and also those which involve a lesser number of the preparatory steps.

The various objects are accomplished by means of the devices illustrated in the accompanying drawings, in which—

Figure 1 is a general perspective view of the machine, some of the details being omitted for clearness. Fig. 2 is a sectional elevation of the machine. Fig. 3 is a section through a portion of the forward end of the machine on enlarged scale. Fig. 4 is a plan view of Fig. 3. Fig. 5 is a perspective view of a portion of the machine, showing the variable-speed mechanism. Fig. 6 is a plan of a portion of shaker-table or conveyer. Fig. 7 is a side view of Fig. 6. Fig. 8 is a perspective view of a detail, showing shaker-drive mechanism. Fig. 9 is a plan of conveyer-trough.

Referring to the drawings, 1 is a frame of suitable width and length.

2 is a shaking-screen located between the side members of the frame. It is provided with an automatically intermittently operated apron or other fruit-stopping devices 3. (Shown in Figs. 2, 3, and 4.)

4 is a rotatable perforated and winged drum which is suitably journaled upon or between the side members of the frame 1. This drum is foraminous, preferably made wholly or in part out of perforated sheet metal. It usually consists of a cylinder 5, having end flanges 6. Between the flanges are radial wings or buckets 7, extending transversely between the flanges. A central shaft or other suitable journal 8 is provided, extending from the ends of the drum and journaled in or upon the sides of the frame 1.

A rake-off 9 is provided, preferably consisting of rake 9, hinged side arms or levers 10, secured upon a shaft 11, transversely supported above the drum 4 and journaled in an upward extension of the sides of the frame at 12, Figs. 2, 3, and 4. The free ends of the arms 10 are connected by the transverse plate or rake 9. The rake is suitably located to operatively engage with the periphery of the cylinder 5 and the wings 7 of the drum 4.

Beneath the drum 4 is a suitable tank 13, so placed that the drum 4 dips thereinto, as shown in the various views. Dipping into the tank 13 is a curved or substantially semi-cylindrical false bottom, which fits with some degree of accuracy the lower half of the winged drum 4. This curved bottom 14 is smooth, obstructionless, and imperforate. (Shown in Figs. 2 and 3.) A steam-heating coil 15 is provided in the tank 13, suitably arranged to be connected with a steam-supply. Adjacent to drum 4 and tank 13 is a substantially similar arrangement of drum, tank, and rake-off, so placed as to receive upon its wings material discharged from the drum 4. Forward of the second drum is provided a suitable conveyer 16 for advancing the fruit longitudinally of the machine. This may consist of a traveling endless conveyer or, as shown in the drawings, Figs. 2, 6, and 7, of a perforated shaker. Means may be provided for turning and reversing the position of the fruit pieces during their traveling progress on this conveyer or shaker. The turning means is here shown as consisting of a series of steps or drop-offs 17, forming a series of shallow tanks with sloping partly-perforated bottoms, as illustrated in Figs. 6 and 7. Spraying means 18 is provided, which may consist of a series of perforated pipes or other suitable spraying-nozzles arranged above or below the path of the fruit or both above and below. At the forward end of the spraying-section just described and adjacent thereto may be placed another drum 19, tank 20, and rake-off 21, substantially similar to that described in connection with the first drum. This is so placed as to receive the material delivered from the sprinkling - section. Forward of this drum 19 and between the side members of the frame 1 is a steamer or steam-box 22, which preferably consists of a space extending some distance longitudinally of the machine, inclosed on its lateral sides and top with a wood or metal casing and its bottom consisting of a suitable traveling conveyer 23, adapted to receive and convey the material delivered from the drum 19. A steam-pipe 24, preferably perforate in such manner as to supply steam to the interior of the steam-box and in contact with the material, is provided. The steam-box conveyer preferably extends to some distance beyond the length of the steam-box and is provided with a suitable spraying device 25, substantially similar to that already described. This spraying device is suitably arranged to operate upon and in connection with that portion of the conveyer 23 which extends beyond the steam-box.

The apron or fruit-stopping device 3, already referred to, may be arranged to coact with the drum 4 and drum 19. It may be constructed as follows: A short part of the shaking-screen 2 adjacent to the drum is formed of a separate piece 26, (which may or not be perforated,) and is hinged to the shaker 2, as shown at 27, Fig. 3. It is preferably provided with sides 28, which may taper inwardly in the direction of the drum, thus contracting the discharge area. A pivoted lever 29 is provided, one end of which is arranged to engage with the wings 7 of drum 4 to be depressed thereby. The other end of the lever is connected through any suitable system of links to the apron 26, as shown in Figs. 3 and 4.

As has already been stated, it is desirable to be able to control with considerable nicety the time of immersion of the material in the various baths and solutions. Too short time would fail of the object, and too long time would spoil the material. For the purpose of controlling the immersion time, therefore, there is provided an adjustable friction driving mechanism, which consists, preferably, of a friction-disk 30, secured upon a shaft 31, suitably journaled in the frame longitudinal thereof. Shaft 31 also is arranged to admit of a slight longitudinal movement. Upon the shaft 31 is secured a worm 32. Upon the shaft 31 and lying between the worm 32 and a journal-box 33, which serves as an abutment, is a coil-spring 34, Fig. 5. At right angles to the shaft 31, and consequently parallel to the face of the disk 30, is a driving-shaft 35, provided with a suitable belt-wheel 37, secured thereon, Fig. 1. Slidably secured upon the shaft 35 is a friction-pulley 38, adapted to engage with the friction-wheel 30 in driving contact therewith. Means are provided for altering the position of the friction-pulley upon the shaft 35, of any suitable character, shown in the drawings as a pivoted hand-lever 39, link 40, and slide-block 41, which latter engages with the friction-pulley 38, Fig. 5.

Engaging with the worm 32 is a gear 42, secured upon the end of the shaft 8 of drum 4. Suitable driving mechanism connects the drums, whereby similar motion is transmitted to each. This may be of any suitable character—as, for example, sprockets and chains, which are indicated in Fig. 2 by dotted lines. The shakers are given motion in the ordinary manner, thoroughly familiar to mechanics skilled in this art. One means is indicated in Fig. 8.

Beyond conveyer 23 and extending in any desired direction from the machine I sometimes employ a final washing, cooling, and conveying device consisting of a trough or sluiceway 43. This usually consists of a box or trough adapted to contain water and provided along one or both of its edges with a water-pipe 44. These pipes 44 are provided with nozzles or outlets 45, directed into the trough at an angle and in the general direction of the length of the trough.

The power mechanism may consist of a transverse shaft 46, Fig. 8, provided with any suitable power connection, as belt-wheel 47. This shaft may also serve as a crank-shaft to operate the conveyer or shaker 16, as shown in Fig. 8, and be connected by suitable belts to the other shakers or conveyers, as indicated in Fig. 2. On the opposite side from the pulley 47 another pulley 48 is provided, alined with pulley 37, with which it is connected by a suitable belt.

The operation of the device is as follows: The shaft 46 being set in motion, the shakers and conveyers are given their appropriate motions through the described connections and the drums are set in rotation. The tanks have been previously supplied with their appropriate solutions. Into the coils of those tanks which are to be heated steam is turned. Water is turned into the various spray pipes and troughs, and the machine is ready to receive its fruit. The fruit is dumped onto the shaker-screen 2 promiscuously, either by hand from the shipping-boxes or fed from an appropriate hopper or chute. The shaker advances the fruit toward the drum, separating therefrom dirt, twigs, leaves, and other refuse meanwhile. The fruit is thus deposited upon the wings of the drum. If no provision were made to guard against it, many pieces of fruit would be caught between the revolving wings of the drum 4 and the edge of the shaker, and thus render unsalable a not inconsiderable percentage. The automatic hinged apron 3 prevents this by rising up and presenting a barrier to the fruit during the passage of each wing. As shown by the drawings, each wing in its rotational movement as it approaches the shaker encounters the lever 29 and by depressing this lever raises the apron 3 on its hinge 27. Continued motion of the drum carries the wing out of engagement with the lever 29, and the apron consequently drops to its normal position as a continuation of the shaker. The fruit is thus fed into the pockets formed by the wings and sides or drum 4 and the smooth imperforate false bottom of the tank. The smooth imperforate character of the false bottom is highly desirable to avoid injury to the fruit. It is equally or more important to prevent the fouling of the solution by small particles of fruit, peel, or refuse lodging therein from the continuous stream of fruit passing through. The continued rotation of the drum carries the fruit slowly down into the solution along the smooth false bottom to the other or discharge side of the solution-tank. Here it encounters the scraper or rake 9, which by engagement with the wing is raised and through its arc motion sweeps or rakes the fruit out of the pocket and from the wing into a pocket of the next drum. It may here be noted that these drums are here set in such relation to each other that the fruit is swept from one drum to the next between the passage of the wings, so no fruit is nipped by the wings of the second drum. Similar action occurs with the second drum, and the fruit is delivered therefrom unto the shaking-table or conveyer 16, upon which it is advanced to the next drum. During this portion of its journey the fruit is subjected to a continuous turning and washing process.

While passing through the solution-tanks the skin of the fruit is softened, loosened, and disintegrated, so that by the time it reaches the conveyer 16 it is in a condition to be mechanically removed by the fine streams of water which play upon it with considerable force.

Fruit when in halves does not readily change its position, and as it is desirable to present all sides of the fruit pieces to the action of the spray it is quite necessary to cause each piece to frequently reverse its position. This is effected by the stepped character of the shaking-conveyer 16. The shallow sloping tanks formed by the steps assist in disposing of the loosened peel by providing a succession of pools of highly-agitated water, which not only washes the surface of the fruit, but also carries the already-separated particles of the peel to and through the perforated portion of the shaking-table.

When a concentrated solution of lye is employed to loosen and disintegrate the peel, it is desirable to remove completely all traces thereof before the fruit is delivered from the machine. When, therefore, the washing of the conveyer-table 16 does not effect this completely, the third drum, with its tank, may be used for a further washing with hot or cold water or a neutralizing solution. As a further precaution the fruit is delivered from the third-mentioned drum to the conveyer and passed through the steam-box, where it is subjected to the heat and mechanical impact of steam-jets, and from thence it is deposited into the final cooling and washing trough 43, from which it is delivered in a condition ready for canning.

While the shaking-tables and conveyers may run at a uniform rate of speed, it is highly desirable that the speed of the drums be varied to suit the varying conditions of the fruit and the strength and temperature of the solution. This is accomplished by the slidable friction-wheel 38 being moved nearer to or farther from the center of plate 30, which thereby is caused to increase or diminish in speed, and consequently to effect the desired change in speed of rotation of drums.

As has been stated, the processing of fruit varies considerably in detail from mere cleansing and dipping to the elaborate series of steps or operation herein described and provided for. Many changes in form, position, and arrangement both as to sequence and number of the devices and details will readily suggest themselves to mechanics without departing from the invention herein disclosed. I therefore do not desire to be confined to the form shown and described for the purpose of illustrating my invention, but

What I claim is—

1. In an apparatus for processing fruit, the combination of a receptacle for liquid, a rotatable drum provided with pockets dipping thereinto to carry material into and out of the liquid, and a rake to discharge said pockets of their burden, said rake engaging portions of the drum and actuated thereby.

2. In an apparatus of the class described, the combination of two tanks for liquid, a rotatable drum for each tank having pockets to carry material into and out of the liquid therein, and a rake to discharge the material from the pockets of one of the drums to the pockets of the other drum.

3. In an apparatus of the class described, the combination of two tanks for liquid, a rotatable drum for each tank having pockets to carry material into and out of the liquid therein, means for feeding material to the pockets of one of the drums including a movable gate, and a rake to discharge the material from the pockets of said drum to the pockets of the other drum, said gate and rake both being actuated by the drum primarily receiving the material.

4. In an apparatus of the class described, the combination of two tanks for liquid, a rotatable drum for each tank having pockets to carry material into and out of the liquid therein, and a rake actuated by one of the drums to discharge the material from the pockets thereof to the pockets of the other drum.

5. In an apparatus for processing fruit, the combination of a tank or receptacle for liquid, a device dipping thereinto to carry fruit into and out of the liquid, a feeder to said device consisting of a shaking-screen provided with an intermittently-removable obstruction in the path of fruit on the screen, means for intermittently removing the obstruction by engaging with the dipping device, and a frame in which the parts are mounted.

6. In an apparatus for processing fruit, the combination of a tank or receptacle for liquid, a device dipping thereinto to carry fruit into and out of the liquid, a feeder to the dipping device consisting of a shaking-screen provided with a hinged apron forming an obstruction at the forward end of the screen and between it and the dipping device, means actuated by the dipping device for intermittently removing the obstruction, a second tank and dipping device, and means intermediate of the dipping devices for transferring fruit from the first to the second dipper, and a frame in which the parts are mounted.

7. In an apparatus for processing fruit, the combination of a tank or receptacle for liquid, a second substantially similar tank adjacent thereto, a rotatable drum having wings or pockets in each of the tanks to carry fruit into and out of the liquid, a rake or the like engaging with and actuated by the wings of the first drum to discharge them of their burden, and act as a feeder to the second drum, a carrier or conveyer adjacent to the first drum and acting as a feeder thereto, a movable obstruction in the path of the fruit upon the conveyer and connections between the obstruction and drum whereby the obstruction is intermittently removed from the path of the fruit, and a frame in which the parts are mounted.

8. In an apparatus for processing fruit, the combination of a tank or receptacle for liquid, a rotatable drum having wings or pockets dipping thereinto to carry fruit into and out of the liquid, a washing device to receive the fruit discharged from the tank, the washing device consisting of a shaking-table having steps or drop-offs to turn the fruit and nozzles or liquid-jets directed to the fruit while on the table, and a frame in which the parts are mounted.

9. In an apparatus for processing fruit, the combination of a tank or receptacle for liquid, a rotatable drum having wings or pockets dipping thereinto to carry fruit into and out of the liquid, a shaking-screen to feed the drum having a hinged forward end, connections with the drum to raise the hinged portion intermittently as an obstruction to fruit on the feeder, a movable conveyer adjacent to the tank to receive the fruit discharged therefrom, said conveyer including means whereby when the conveyer is moved, the fruit thereon will be turned, means for washing the fruit while being turned, a steam-box adjacent to the conveyer, means for passing the fruit through the steam-box, and a frame in which the parts are mounted.

10. In an apparatus for processing fruit, the combination of a tank or receptacle for liquid, a rotatable drum having wings or pockets dipping thereinto to carry fruit into and out of the liquid, a second substantially similar drum adjacent thereto, a rake-off device between the drums engaging with the wings with the first drum to discharge them of their burden, into the second tank, a shaking-screen to feed the first drum, having a hinged forward end, connections with the drum to raise the hinged portion intermittently as an obstruction to the fruit on the feeder, a conveyer to receive the fruit discharged from the second drum, a washing device for the fruit, a steam-box with means for passing the fruit thereto, a trough or sluiceway with jets or nozzles directed thereinto to receive and wash the fruit discharged from the steam-box, and a frame in which the parts are mounted.

11. In an apparatus for processing fruit, the combination of a tank or receptacle for liquid, a rotatable drum provided with wings or pockets dipping thereinto to carry fruit into and out of the liquid, a false bottom to the tank adjacent and conforming to the lower part of the periphery of the drum, a feeder to the drum, a shaking-table having a series of shallow troughs to receive the fruit discharged from the drum, a steam-box with means for passing the fruit therethrough, and a frame in which the parts are mounted.

12. In an apparatus for processing fruit, the combination of a tank or receptacle for liquid, a rotatable drum provided with wings or pockets dipping thereinto to carry fruit into and out of the liquid, an imperforate false bottom to the tank adjacent and conforming to the lower part of the periphery of the drum, an intermittent feeder to the drum, a conveyer adjacent to the drum to receive the fruit discharged therefrom, the conveyer consisting of a perforated shaking-table provided with a series of shallow transverse troughs each having an abrupt and a sloping side constituting a succession of steps or drop-offs, means for applying streams of liquid directed to the fruit while on the conveyer, and a frame in which the parts are mounted.

13. In an apparatus for processing fruit, the combination of a tank or receptacle for liquid, means for heating the liquid, means for carrying fruit into and out of the tank, a feeder to the tank comprising a shaking-screen having a hinged forward part with means for raising this part as an obstruction intermittently, a conveyer to receive the fruit discharged from the tank, means adjacent thereto to direct streams of liquid to the fruit while on the conveyer, a steam-box with means to pass the fruit therethrough, means for cooling the fruit adjacent to the steam-box, consisting of a device for applying cooling liquid to the fruit as it emerges from the steam-box, and a frame in which the parts are mounted.

14. In an apparatus for processing fruit, the combination of a tank or receptacle for liquid, a rotatable drum having wings or pockets dipping thereinto to carry fruit into and out of the liquid, a rake-off device consisting of a plate or bar axially parallel to the drum and engaging with the wings to discharge them of their burden, arms or levers to which the plate is attached pivoted above the drum, and a frame in which the parts are mounted.

15. In an apparatus for processing fruit, the combination of a tank or receptacle for liquid, a rotatable drum having wings or pockets dipping thereinto to carry fruit into and out of the liquid, a rake-off device consisting of a plate or bar axially parallel to the drum and engaging with the wings to discharge them of their burden, arms or levers to which the plate is attached pivoted above the drum, a shaking-screen feeder to the drum, having a hinged forward part, a lever in the path of the drum-wings connected to the hinged part to raise it as an obstruction by engagement with the wings, and a frame in which the parts are mounted.

16. In an apparatus for processing fruit, the combination of a tank or receptacle for liquid, a rotatable drum having wings or pockets dipping thereinto to carry fruit into and out of the liquid, a rake-off device consisting of a plate or bar axially parallel to the drum and engaging with the wings to discharge them of their burden, arms or levers to which the plate is attached pivoted above the drum, a second substantially similar arrangement of tank and rake-off device adjacent thereto to receive the fruit discharged from the first, a shaking-screen feeder to the first drum having a hinged forward part, a lever in the path of the drum-wings connected to the hinged part to raise it as an obstruction by engagement with the wings, and a frame in which the parts are mounted.

17. In an apparatus of the class described, the combination with a tank for liquid, a device to carry fruit into and out of the liquid, a feeder for said device provided with a gate, and a rake to discharge the fruit from said device, said gate and rake both being actuated by said device.

18. In an apparatus of the class described, the combination of a tank for liquid, a rotatable drum provided with wings to carry fruit into and out of the liquid, a feeder to the drum provided with a gate actuated by the wings of the drum, and a rake actuated by the wings of the drum to discharge them of their burden.

19. In an apparatus of the class described the combination of two tanks for liquid, a dipping device for each tank to carry fruit into and out of the liquid therein, a feeder to one of said dipping devices provided with a gate and a rake to discharge the material from said dipping device to the other dipping device, said gate and rake both being actuated by the dipping device primarily receiving the material.

20. In an apparatus of the class described, the combination of a tank for liquid, a second similar tank, a rotatable drum for each tank to carry fruit into and out of the liquid therein, said rotatable drums being provided with wings, a feeder to the rotatable drum of the first tank provided with a gate, and a rake to discharge the fruit from said rotatable drum to the rotatable drum of the second tank, said gate and rake both being actuated by the wings of the rotatable drum of the first tank.

21. In an apparatus of the class described, the combination with a tank for liquid, a second tank, a rotatable drum for each tank to carry fruit into and out of the liquid therein, said rotatable drums being provided with wings, a feeder to the rotatable drum of the first tank provided with a gate and a rake to discharge the fruit from said rotatable drum to the rotatable drum of the second tank, said gate and rake both being actuated by the wings of the rotatable drum of the first tank, mechanism for operating the rotatable drums coördinately and at a uniform speed, and a variable-speed gearing for actuating said mechanism.

WILLIAM C. ANDERSON.

Witnesses:
D. B. RICHARDS,
JESSE R. EOFF.